Oct. 20, 1970 HISAO KINJO 3,535,468

MAGNETIC VIDEO RECORDING AND REPRODUCING SYSTEM AND APPARATUS THEREFOR

Filed Feb. 29, 1968 3 Sheets-Sheet 1

INVENTOR
HISAO KINJO

BY Louis Bernat

ATTORNEY

INVENTOR
HISAO KINJO

BY Louis Bernat

ATTORNEY

INVENTOR
HISAO KINJO

BY Louis Bernat

ATTORNEY 3,535,468

MAGNETIC VIDEO RECORDING AND REPRODUCING SYSTEM AND APPARATUS THEREFOR

Hisao Kinjo, Yokohama, Japan, assignor to Victor Company of Japan, Limited, Moriya-cho, Kanagawa-ku, Yokohama, Japan Filed Feb. 29, 1968, Ser. No. 709,362
Claims priority, application Japan, Mar. 3, 1967, 42/13,457
Int. Cl. G11b *5/02;* H04n *5/76, 5/78*
U.S. Cl. 179—100.2 8 Claims

ABSTRACT OF THE DISCLOSURE

A magnetic recording and reproducing system uses a pair of magnetic heads for recording frequency modulated video signals on a magnetic tape. The video signals are recorded in oblique tracks, each track having signal overlap portions on opposite ends. Fixed heads demagnetize and erase the signal overlap portions in the oblique tracks. Signals reproduced from the oblique tracks that have been so demagnetized and erased are then mixed to provide continuous video signals in play back.

This invention relates to magnetic recording and reproducing systems and apparatus therefor. In particular, it relates to a magnetic recording and reproducing system in which a plurality of rotary magnetic heads are employed for recording video signals in oblique tracks on a magnetic tape. These same heads produce continuous signals by alternately playing back the intermittent signals obtained by reproducing the video signals recorded in the oblique tracks.

In recording video signals, magnetic recording and reproducing apparatus of the described type generally subjects continuous video signals to means for providing a comparable frequency modulated signal. This FM signal is then recorded in successive oblique tracks on a magnetic tape, as intermittent signals. Recording is accomplished by a plurality of magnetic heads mounted on opposite sides of a rotating disk which results in signal overlap portions being disposed at opposite ends of the adjacent oblique tracks. Several systems are now available for reproducing these recorded intermittent signals as continuous signals. In one of such known systems, the intermittent recorded signals are reproduced as they stand, and connected they are together after the signal overlap portions are electrically attenuated, at least to a certain degree. This system is called a "channel mixing" system. Another system (which is called a "switching system") operates in a manner such that the playback heads are switched instantaneously to produce continuous signals.

These conventional systems have disadvantages. They use a complicated mechanism, and their costs are high. They do not lend themselves to use with simplified magnetic recording and reproducing apparatus. To provide a simplified magnetic recording and reproducing apparatus, recent efforts have incorporated a system which mixes reproduced signals with unmodified signal overlap portions for producing continuous video signals in playback. A disadvantage of this system is that signal overlap portions tend to produce a beat noise even when frequency modulated signals are used. These beats make it impossible to produce stable pictures in playback. The present invention overcomes all the aforementioned disadvantages of the conventional systems.

The principal object of the present invention is to provide a magnetic recording and reproducing system, and an apparatus therefor, which is simple in construction and yet produces stable pictures of high quality.

Another object of the invention is to provide a magnetic recording and reproducing system, and an apparatus therefore, which produces stable continuous signals responsive to the playback of intermittent signals.

A further object of the invention is to provide a magnetic recording and reproducing system, and an apparatus therefor, in which the end portions of tracks are demagnetized and erased to eliminate overlap signals. Then the reproduced signals do not overlap, and the remaining signal segments can be connected together as they stand to produce stable continuous signals without developing a beat noise.

Other objects and advantages of this invention will become apparent from the description hereafter set forth as considered in conjunction with the drawings annexed hereto, in which.

Figures 4A, 4B, 4C:
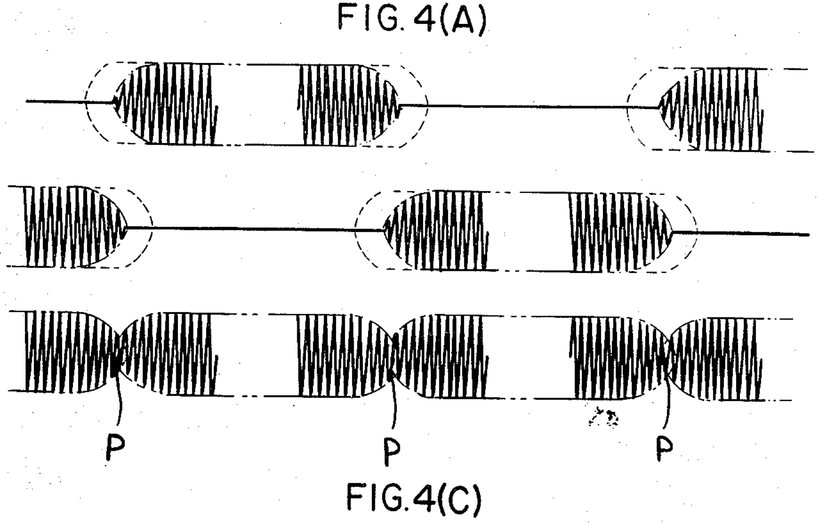
Figures 5A, 5B:
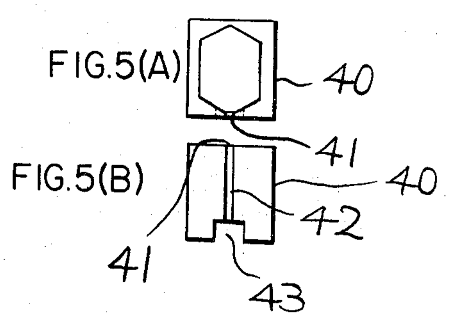
Figures 6A, 6B, 6C:
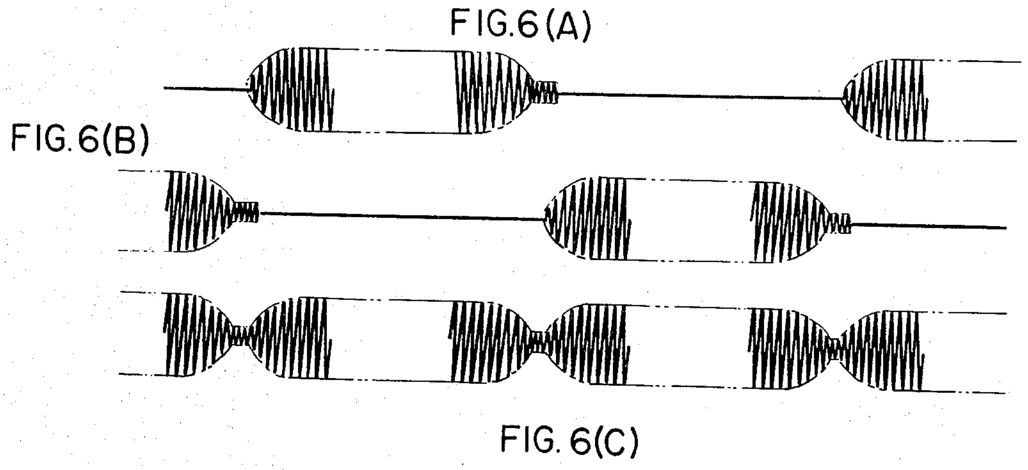

FIGS. 4(A), 4(B) and 4(C) are diagrams of wave forms, showing the levels of reproduced signals;

FIGS. 5(A) and 5(B) are a plan view and a front elevation view, respectively, of another embodiment of a magnetic erasing head; and FIGS. 6(A), 6(B) and 6(C) are diagrams of wave forms showing the levels of signals reproduced by using the magnetic erasing head of FIG. 5.

Figure 1:
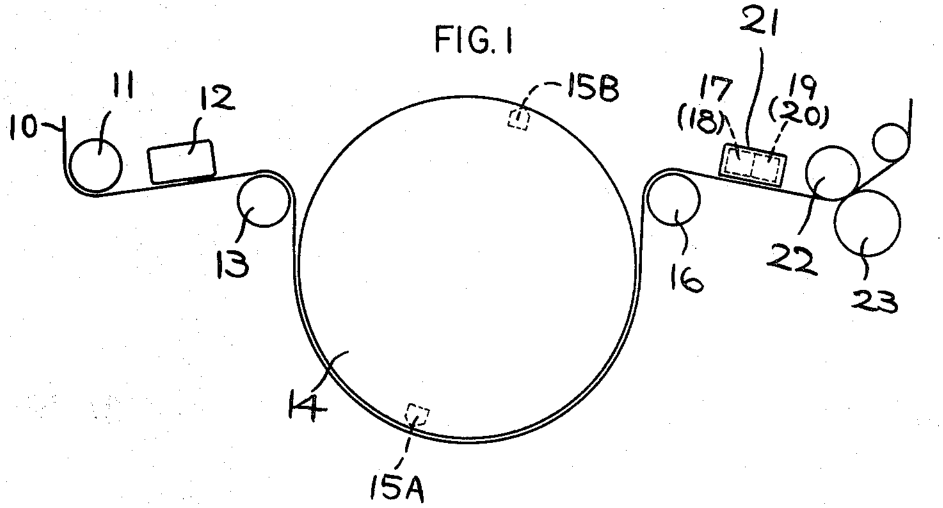
FIGS. 1 and 2 are a plan view and a perspective view, respectively, showing essential portions of one embodiment of a magnetic recording and reproducing apparatus incorporating this invention.
Figure 2:
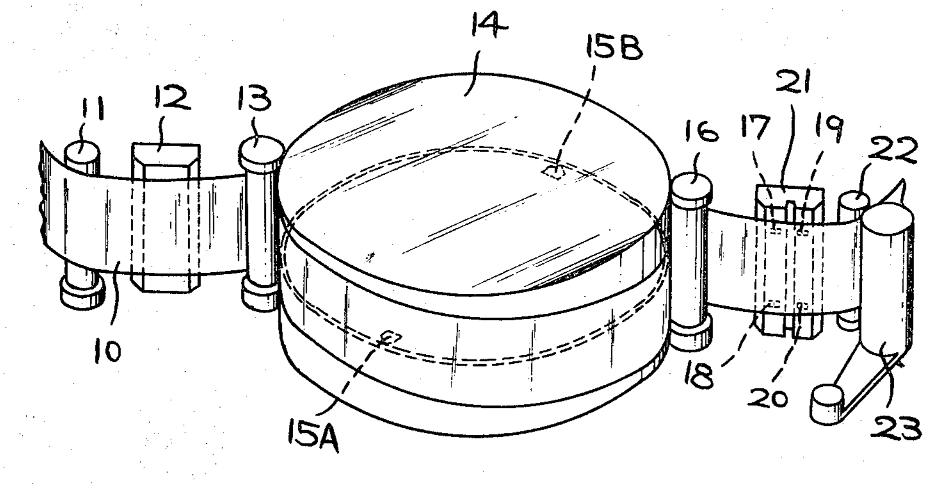

FIGS. 1 and 2 show the essential portions of an exemplary two-head magnetic recording and reproducing system of a type to which the invention is applied. A magnetic tape 10, unwound from a supply reel( not shown), is pulled past a guide pole 11 and a full width magnetic erasing head 12. The erased tape is then guided by a guide pole 13 to maintain a contact between the tape and a part of the peripheral surface of a guide drum 14. The guide drum 14 consists of an upper portion and a lower portion spaced apart from each other by a gap. Two magnetic heads 15A and 15B, for recording and reproducing frequency modulated video signals, are mounted on a revolving disk which rotates in the gap.

The magnetic tape 10 maintains contact with the guide drum 14 over a portion which extends over about 180° to 200°, for example, of the peripheral drum surface. The path of tape travel is disposed angularly with respect to the direction of rotation of the magnetic heads 15A and 15B. After the magnetic tape 10 has travelled around a part of the guide drum 14, it is guided by a guide pole 16. Upon leaving the drum, the tape is brought into contact with a fixed magnetic head block 21. A signal processing and erasing magnetic head 17 and a sound signal recording and reproducing magnetic head 19 are disposed in block 21 to come into contact with the upper edge portion of the magnetic tape 10. A signal processing and erasing magnetic head 18 and a control signal recording and reproducing magnetic head 20 are disposed in a position which comes into contact with the lower edge portion of the magnetic tape 10. These four magnetic heads are formed integral with one another. The tape 10 is then pulled between a capstan 22 and a pinch roller 23, after which it is wound on a takeup reel (not shown).

Figure 3:
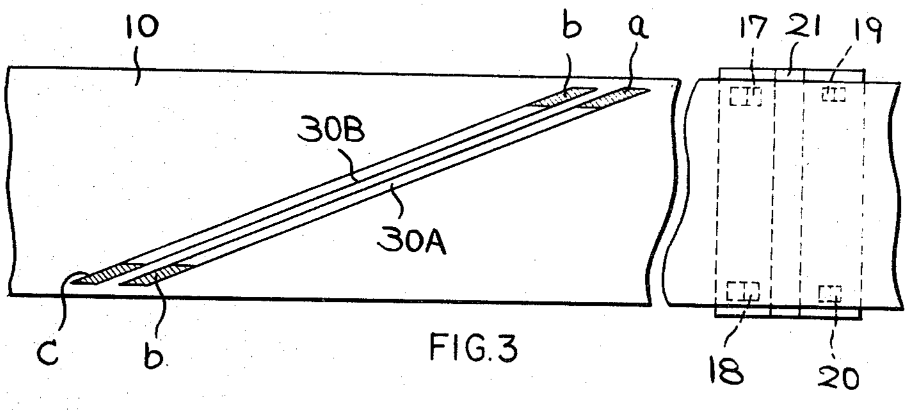
FIG. 3 is a schematic view of a portion of a magnetic tape and erasing magnetic heads of a system constructed according to this invention.

Since the magnetic tape 10 is maintained in contact with a portion of the peripheral surface of the guide drum 14, parallel tracks 30A, 30B are recorded when heads 15A, 15B alternately contact the tape 10, as shown in FIG. 3. These tracks are disposed obliquely at an angle of 2° to 4° with respect to the longitudinal axis of the tape. Adjacent tracks have overlapping signals recorded simultaneously by opposing heads 15A, 15B when they are in simultaneous contact at the upper and lower edges of the tape 10. The drawing is crosshatched to show the signal overlap portions *a*, *b*, *c* . . . which contain the same frequency modulated signal, (e.g., the same signals are recorded at two places marked "*b*"). Thus, tracks along the upper and lower edges of the tape carry the signals which overlap and contain the same frequency modulated signal information. The signal information recorded in each track corresponds substantially to one field or one frame, except for the signal information contained by the signal overlap portions.

In conventional magnetic recording and reproducing apparatus, the magnetic erasing heads 17 and 18 are mounted in positions where they do not demagnetize and erase the signal overlap portions of the recorded tracks 30A, 30B . . . .

In systems constructed according to this invention, however, the signal processing and erasing magnetic heads 17 and 18 are positioned to demagnetize and erase nearly all of the signal overlap portions, with only small parts of the overlap being left unerased. The magnetic head 17 may be one which has a gap length which is larger than the conventional gap length on sound signal erasing magnetic heads.

In the system according to this invention, continuous frequency modulate dsignals are recorded, as aforementioned, in a plurality of oblique tracks on a magnetic tape. The successive tracks are intermittent signals successively recorded by the magnetic heads 15A and 15B. The signal overlap portions of the tracks are demagnetized and erased by the magnetic heads 17 and 18. The frequency modulated signals that remain recorded in the tracks are reproduced as they stand, and they are mixed during playback to provide a continuous signal. The processing of signals during playback will be explained with reference to FIG. 4. FIG. 4(A) shows a wave form of frequency modulated signals of a first channel reproduced by the first magnetic head 15A. FIG. 4(B) shows a wave form of frequency modulated signals of a second channel reproduced by the second magnetic head 15B. In each figure, portions defined by a dotted line represent the signals, as recorded and prior to demagnetization and erasure of the overlapped signal. Portions of the wave between a dotted line envelope and a double dash and dot line envelope are the portions that are demagnetized and erased by the magnetic heads 17 and 18. The reproduced, intermittent, frequency modulated signals for each channel shown in FIGS. 4(A) and 4(B) are mixed by a conventional slip ring commutator to provide a continuous wave form, as shown in FIG. 4(C). This waveform provides continuous frequency modulated signals.

The magnetic heads 17 and 18 are disposed so that a signal overlap portion having a duration of about 200 to 250$\mu$ seconds (a time interval corresponding to three to four horizontal scanning periods) is retained in the wave form portion P which connects the intermittent frequency modulated signals together. Leaving unerased signal overlap portion of a short duration ensures that the reproduced signals are positively connected together to provide continuous signals. Since the reproduced signals are frequency modulated signals, beat disturbances can never occur by virtue of the masking effect.

The magnetic erasing heads scan the magnetic tape in the longitudinal direction of the tape, so that the signal level at the ends of the tracks is successively increased or reduced. Accordingly, opposite ends of reproduced signals for each channels are conveniently attenuated as shown in FIG. 4. This facilitates the connecting together of the signal overlap portions.

Alternatively, only one magnetic erasing head may be employed to erase the signal overlap portion at either the upper end or the lower end of each track on the magnetic tape. The use of two magnetic erasing heads is shown as the preferred embodiment for demagnetizing and erasing the signal overlap portions at both the upper end and the lower end of each track because the remaining track is then centered on the tape. This centering helps eliminate the possibilities that the magnetic heads 15A and 15B will not be in full contact with the magnetic tape 10 soon after the tape comes into contact with the guide drum 14 and shortly before it is released from contact therewith. Thus, centering the recorded tracks on the tape provides stable pictures in playback. Further, by suitably controlling the flow of a current to the magnetic erasing heads, it is possible to adjust the degree of demagnetizing or attenuating factor of the signal overlap portions, to any value as desired.

FIGS. 5(A) and 5(B) show, in a plan view and a front view respectively, another embodiment of a magnetic erasing head. A core 40 has a gap 41 which includes a smaller width gap portion 42 and a larger width gap portion 43. By selecting a proper width for the larger gap portion, it is possible to demagnetize the signal overlap portions at any degree of demagnetizing attenuating factor, as desired.

FIGS. 6(A) to 6(C) show signals obtained by reproducing recorded signals which have been recorded by using two magnetic erasing heads. One head is the magnetic erasing head of the second embodiment constructed in the manner described in FIG. 5. The other head is the magnetic erasing head of the first embodiment constructed in the manner in FIGS. 1–3. FIG. 6(A) shows the wave form of frequency modulated signals of the first channel reproduced by the first magnetic head 15A. FIG. 6(B) shows the wave form of frequency modulated signals of the second channel reproduced by the second magnetic head 15B. One of the signal overlap portions of each reproduced frequency modulated signal is demagnetized in such a manner that its level is attenuated by about −12 db as compared with the level of the other signal overlap portion which is not demagnetized. FIG. 6(C) shows the continuous frequency modulated signals obtained by mixing the reproduced frequency modulated signals of the first and second channels. The signals demagnetized by the magnetic erasing head of the first embodiment and the signals demagnetized by the magnetic erasing head of the second embodiment are connected together by the attenuated connecting portion of the signals. The phenomenon of beat noise does not occur in the connecting portion because of the masking effect which is characteristic of frequency modulated signals. It is thus possible to produce continuous frequency modulated signals of high quality during playback.

It is to be understood that the present invention is not limited to the embodiments set forth hereinabove, and that various changes and modifications may be made therein without departing from the spirit and scope of the invention.

What is claimed is:

1. A magnetic recording and reproducing system comprising a magnetic tape, rotating means for mounting a plurality of magnetic recording and reproducing heads for sequentially contacting said magnetic tape, means for recording continuous video signals in a plurality of discrete tracks on said magnetic tape, each of said tracks being disposed obliquely with respect to the longitudinal axis of the tape, means for guiding said magnetic tape relative to said plurality of magnetic heads in a manner such that the plurality of magnetic heads form signal overlap portions near opposite ends of said plurality of tracks, the signal overlap portions at opposite ends of adjacent tracks containing the same recorded signal information, means for partly demagnetizing and erasing the signal overlap portion on at least one end of each of the tracks on said magnetic tape so that a small portion of the signal overlap portions is left with attenuated signal levels to provide a brief overlap period during a short interval of time, and means for reproducing and mixing signals deriving from the tracks on the magnetic tape from which the signal overlap portions have partly been demagnetized and erased whereby continuous signals can be produced in playback.

2. The magnetic recording and reproducing system of claim 1 in which said small portion of the signal overlap portions have a duration of approximately 200 to 250 $\mu$ seconds.

3. The magnetic recording and reproducing system of claim 1 which further comprises means for recording and reproducing sound signals and control signals, said last named means being disposed near the ends of the tracks on the magnetic tape erased by said demagnetizing and erasing means.

4. The magnetic recording and reproducing system of claim 1 in which said demagnetizing and erasing means comprises two magnetic erasing heads, one of said heads having a single gap having at least two portions with different gap width for leaving said small portion of the signal overlap portions having a signal level of a predetermined degree of attenuation.

5. A magnetic recording and reproducing apparatus comprising a plurality of magnetic heads revolving about a common axis for alternately and sequentially recording continuous video signals in a plurality of discrete tracks on a magnetic tape, each of said tracks being disposed obliquely with respect to the longitudinal axis of the tape, a guide drum for guiding said magnetic tape, said plurality of magnetic heads being rotatably mounted inside said drum, a guide pole for guiding said magnetic tape into and out of contact with said guide drum at points such that said magnetic heads form signal overlap portions near opposite ends of adjacent ones of said plurality of discrete tracks, said signal overlap portions containing the same signal information, two fixed magnetic erasing heads for partly demagnetizing and erasing the signal overlap portions such that a small portion of the signal overlap portions is left with attenuated signal levels to provide a brief overlap period during a short interval of time, and means for reproducing and mixing signals deriving from the discrete tracks from which the signal overlap portions have partly been demagnetized and erased whereby a continuous signal can be produced in playback.

6. The magnetic recording and reproducing apparatus of claim 5 in which one of said erasing heads has a single gap which consists of gap portions having differing gap widths for leaving said small portion of the signal overlap portions having a signal level of a predetermined degree of attenuation.

7. The magnetic recording and reproducing apparatus of claim 5 which comprises fixed magnetic heads for recording and reproducing sound signals and control signals, said fixed heads being disposed at positions where said heads are near the ends of the discrete tracks on the magnetic tape.

8. The magnetic recording and reproducing apparatus of claim 7 in which said erasing heads and said fixed heads for recording and reproducing sound signals and control signals are fabricated integrally into a fixed magnetic head block.

References Cited

UNITED STATES PATENTS

| | | | |
|---|---|---|---|
| 3,031,525 | 4/1962 | Oniki | 178—6.6 |
| 3,239,603 | 3/1966 | Kihara | 178—6.6 |
| 3,244,818 | 4/1966 | Bick et al. | 179—100.2 |
| 3,320,371 | 5/1967 | Bach | 179—100.2 |
| 3,441,687 | 4/1969 | Inoue et al. | 178—6.6 |
| 3,445,608 | 5/1969 | Kinjo et al. | 179—100.2 |

STANLEY M. URYNOWICZ, Jr., Primary Examiner

W. F. WHITE, Assistant Examiner

U.S. Cl. X.R.

178—6.6